INVENTOR.
JOSEPH F. FISHER
BY
Fordyce A. Bothwell
ATTORNEY

INVENTOR.
JOSEPH F. FISHER
BY
Fordyce A. Bothwell
ATTORNEY 2,998,480

FLYING SPOT SCANNER SYSTEM INCLUDING CORRECTION FOR SHADING

Joseph F. Fisher, Wynnewood, Pa., assignor to Philco Corporation, Philadelphia, Pa., a corporation of Pennsylvania Filed Aug. 18, 1959, Ser. No. 834,606
9 Claims. (Cl. 178—7.2)

Figure 1:
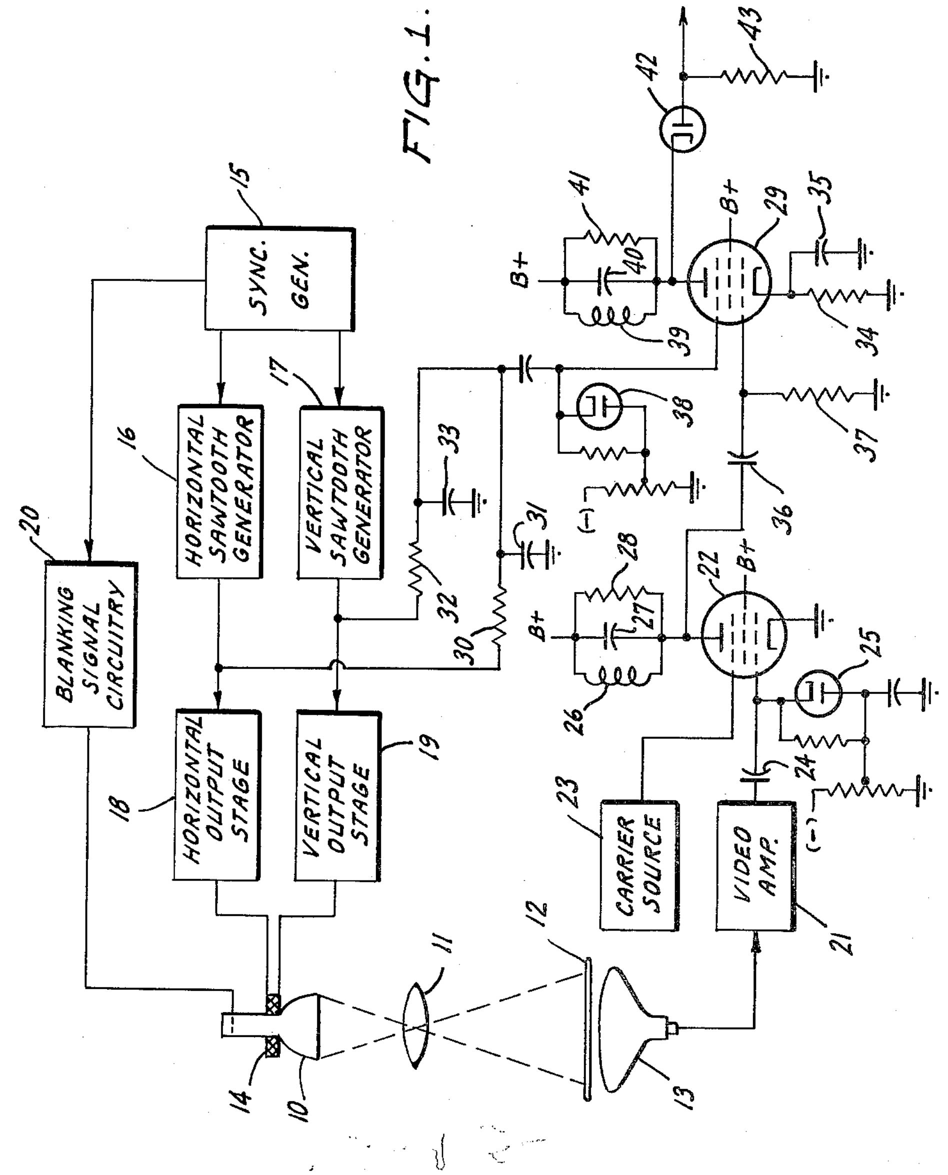

This invention relates to shading correction in flying spot scanner systems.

In such a system, a constant intensity raster is focussed upon an image-containing transparency or film and the light passing therethrough is received by a photocell, usually a large photomultiplier tube, which produces a video signal representing the image. So-called shading (distortion) of the video signal tends to be caused by distortion of the projection lens, by fall-off of sensitivity of the large photomultiplier tube near its outer edge, and by variation of light output from the flying spot scanner tube. To properly correct for shading of the video signal, the latter must be modulated by parabolic correction signals, and sometimes by a combination of parabolic and sawtooth correction signals, having frequencies corresponding to the line and frame scanning frequencies. In other words, it is necessary to produce a corrected video signal which is solely the product of the uncorrected video signal and the correction signals. The correction signals must be multiplied by the average value of the video signal at all instants of time so as to provide substantially perfect correction for all levels of signal derived from the output of the photomultiplier tube. In comparison, a system which merely adds a fixed value of correction signal only provides correction at one film density level. This is true because the amplitude of the shading signal at the output of the photomultiplier is a function of the density of each elemental area of the scanned film. In addition, the corrected video signal must retain the black level corresponding to zero signal, and if the correction signals are simply added to the uncorrected video signal, the correction component in the corrected signal is always present and there is no true black level.

The parabolic correction signals can be readily provided by integrating the sawtooth signals which are produced in the horizontal and vertical deflection circuits of the scanner tube. However, a problem has existed with respect to the production of a corrected video signal which is solely the product of the uncorrected video signal and the correction signals. It is possible of course to effect multiplication of these signals by applying the uncorrected video signal to one grid of a multi-grid tube and by applying the correction signals to another grid of said tube. However, when the video signal goes to zero the correction signals are still present and the result is the same as in the case where the signals are simply added. In addition, in a system of this type both the sum and the product of the uncorrected video signal and the correction signal appears across the tube plate load, and as a result the shading component is not corrected at all video levels between black and white.

One object of this invention is to provide a satisfactory solution of this problem.

Another object of this invention is to provide, in a flying spot scanner system, a simple arrangement for producing the desired corrected video signal consisting solely of the product of the uncorrected video signal and the correction signals. In accordance with this invention, a high frequency carrier is modulated with the uncorrected video signal in such manner that the black level of the video signal corresponds to zero carrier, and the carrier is also modulated with the correction signals. This effectively removes the product of the video signal and the correction signals frequency-wise from the relatively low frequency correction signals alone and enables suppression of the latter whenever the video signal and the carrier go to zero. At other times the product of the uncorrected video signal and the correction signal is derived by demodulating the modulated carrier.

Figure 2:
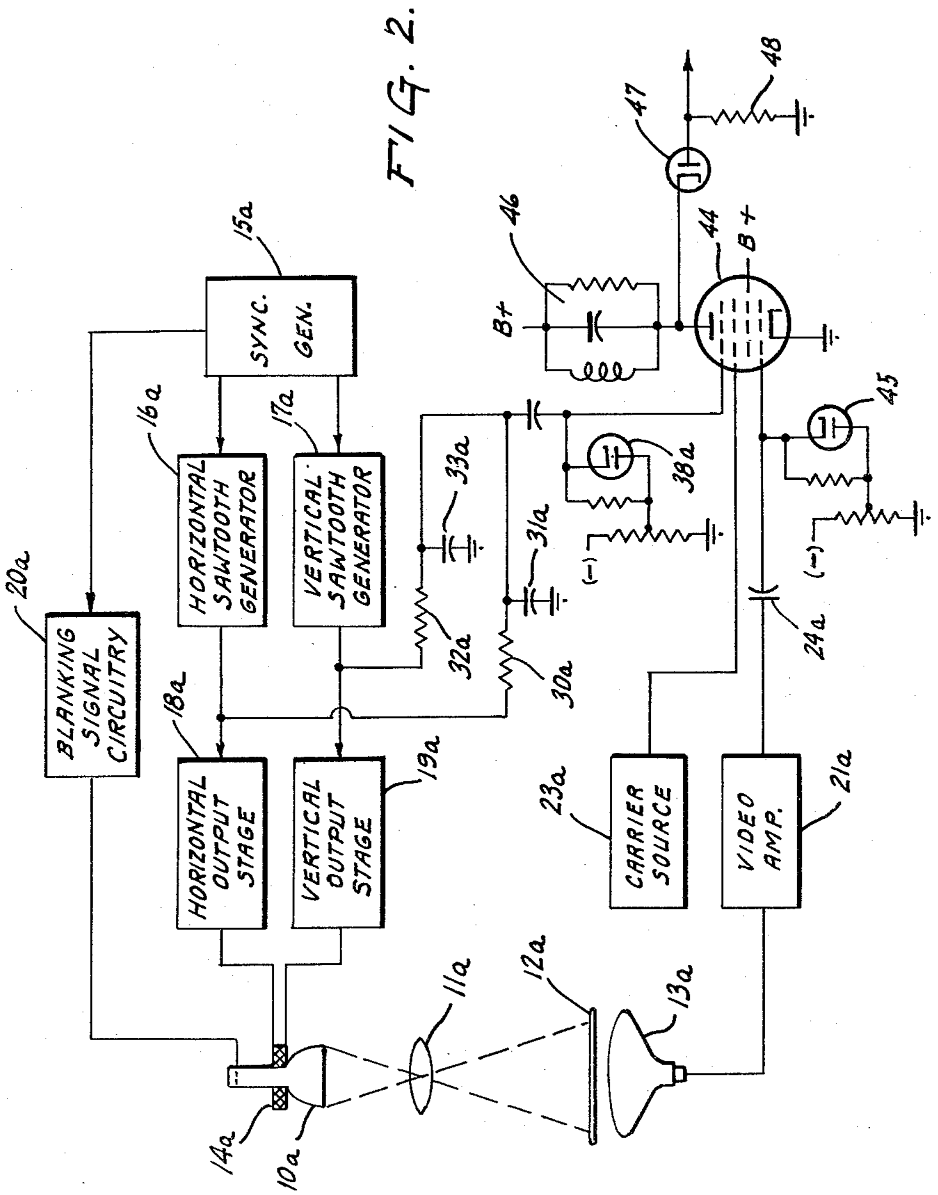

The invention may be fully understood from the following detailed description with reference to the accompanying drawing wherein FIG. 1 is a diagrammatic illustration of a flying spot scanner system incorporating one embodiment of the present invention; and FIG. 2 is a similar illustration of a flying spot scanner system incorporating another embodiment of the invention.

Referring first to FIG. 1, there is shown a flying spot scanner system wherein the scanner tube 10 by its scanning action produces a constant intensity light raster which is projected through lens 11 onto the image-containing transparency or film 12, and a phototube 13, which preferably is a large photomultiplier tube, receives the light passing through the transparency and produces a video signal representing the image. The scanning action of the scanner tube 10 is produced in well-known manner by horizontal and vertical sawtooth deflection currents in yoke 14 having the line and frame frequencies which may be the now-standard frequencies of 15.75 k.c. and 60 cycles per second. The deflection currents are produced by the usual devices here represented by blocks, comprising the synchronizing generator 15, the horizontal and vertical sawtooth generators 16 and 17, and the horizontal and vertical output stages 18 and 19. Blanking of the video signal during horizontal and vertical retrace is effected by the usual blanking signals supplied to the control grid of the scanner tube 10 from the blanking signal circuitry represented by block 20.

As hereinbefore stated, it is characteristic of the flying spot scanner system that so-called shading of the video signal tends to be caused by distortion of the projection lens, by fall-off sensitivity of the photomultiplier near its outer edge, and by uneven light output from the scanner tube. The shading has both line and frame components, and while it is known that it can be eliminated by modulating the video signal with correction signals having frequencies corresponding to the line and frame scanning frequencies, a problem has existed as hereinbefore stated.

In the system of FIG. 1, the uncorrected video signal, after amplification in video amplifier 21, is applied to one of the grids of a multi-grid tube 22, and a high frequency carrier from source 23 is applied to another grid of said tube, thereby to effect amplitude modulation of the carrier with the video signal. In the specific illustration the tube 22 is a pentode, and the video signal is applied to the control grid through coupling capacitor 24 while the carrier is applied to the third grid. The carrier source 23 may be a conventional sine wave oscillator. The carrier frequency preferably is 50 mc. which is much higher than the line and the frame scanning frequencies. Connected to the control grid of tube 22 is a D.C. restoration circuit including a diode 25. In the plate circuit of tube 22 is a broad band network comprising inductor 26, capacitor 27 and the resistor 28, which passes all of the high frequency components of the modulated signal.

The modulated signal is supplied to a second stage including tube 29, as are also the parabolic correction signals for eliminating the shading of the video signal. The correction signals may be produced by integrating sawtooth signals from generators 16 and 17 into parabolic signals. Thus in the illustrated system a sawtooth signal is derived from the output of generator 16 and is supplied to integrating means comprising a resistor 30 and a capacitor 31 to produce a parabolic correction signal having the line scanning frequency. Similarly a sawtooth signal is derived from the output of generator 17 and is supplied to integrating means comprising a resistor 32 and a capacitor 33 to produce a parabolic correction signal having the frame scanning frequency.

In the specific illustration tube 29 is a pentode in the cathode circuit of which is a resistor 34 shunted by a capacitor 35. The modulated signal derived at the plate of tube 22 is supplied to the first grid of tube 29 through coupling capacitor 36 and grid resistor 37. The correction signals are supplied to the third grid of tube 29. Connected to the same grid is a D.C. restoration circuit including a diode 38. In the plate circuit of tube 29 is a network comprising an inductor 39, a capacitor 40 and a resistor 41, which network has high impedance at the carrier frequency (e.g. 50 mc.) but practically zero impedance at the relatively low line and frame scanning frequencies. Consequently the modulated carrier signal, which is now modulated with both the uncorrected video signal and the correction signals, appears at the plate of tube 29 but the correction signals alone are incapable of producing any output signal.

Now in order that there shall be no output when the video signal goes to zero, i.e. to the black level, it is necessary that the black level correspond to zero carrier. Then when the video signal goes to zero there is no carrier present, and the correction signals alone cannot produce any output signal. This result may be achieved by supplying the video signal from amplifier 21 in positive polarity (i.e. black level negative) to the control grid of tube 22 and by applying a reference voltage to the plate of the D.C. restoration diode 25 such that tube 22 is cut off when the video signal goes to zero, i.e. the black level.

The modulated carrier appearing at the plate of tube 29 is supplied to a diode detector 42, and the detected modulation signal, which is the corrected video signal, appears across the load resistor 43 and is derived at the output.

Referring now to FIG. 2, the system there shown is similar to that of FIG. 1 except that the modulation of the high frequency carrier with both the uncorrected video signal and the correction signals is performed in a single stage including a multi-grid tube 44. The components which are identical with FIG. 1 and which do not require further description are designated by the same reference numerals with the letter "*a*" as a suffix. The video signal from amplifier 21 is supplied in positive polarity to the control grid of tube 44, and the voltage on the plate of the D.C. restorer diode 45 is assigned a voltage such that the tube is cut off when the video signal goes to zero, i.e. the black level. Network 46 corresponds to the network in the plate circuit of tube 29 in FIG. 1, and it has high impedance at the carrier frequency but practically zero impedance at the relatively low line and frame scanning frequencies. When the video signal and the carrier go to zero, the correction signals alone are incapable of producing any output due to the character of network 46. At all other times the double modulated carrier is supplied to diode detector 47, and the corrected video signal appears across the load resistor 48.

While certain embodiments of the invention have been illustrated and described, it is to be understood that the invention is not limited thereto but contemplates such modifications and further embodiments as may occur to those skilled in the art.

I claim:

1. In a flying spot scanner system wherein a video signal having a black level representing zero signal is produced and it is desired to effect shading correction of the video signal by means of correction signals, means for providing shading-correction signals, means for amplitude modulating a high frequency carrier with the video signal in such manner that said black level corresponds to zero carrier, and for also amplitude modulating said carrier with said shading-correction signals, means for demodulating the modulated carrier to derive a corrected video signal, and means effective when the uncorrected video signal and said carrier go to zero for suppressing said correction signals.

2. A flying spot scanner system according to claim 1, wherein the means for modulating said carrier includes a first modulator stage in which the carrier is amplitude modulated with the video signal and a second modulator stage in which the carrier is amplitude modulated with the shading-correction signals.

3. A flying spot scanner system according to claim 1, wherein the means for modulating said carrier comprises a single modulator stage in which the carrier is amplitude modulated with both the video signal and the shading-correction signals.

4. In a flying spot scanner system wherein a video signal having a black level representing zero signal is produced and it is desired to effect shading correction of the video signal by means of correction signals, means for providing shading-correction signals, means for amplitude modulating a high frequency carrier with the video signal in such manner that said black level corresponds to zero carrier, and for also amplitude modulating said carrier with said shading-correction signals, said modulating means including at least one vacuum tube from the plate circuit of which the modulated carrier is derived, means for demodulating the modulated carrier to derive a corrected video signal, and an impedance network in the plate circuit of said tube effective when the uncorrected video signal and said carrier go to zero for suppressing said correction signals.

5. In a flying spot scanner system wherein a video signal having a zero level is produced and it is desired to modulate the video signal with shading-correction signals, means for amplitude modulating a high frequency carrier with said video signal in such manner that zero level of the video signal corresponds to zero carrier, means for providing shading-correction signals, means for multiplying the video-modulated carrier and said correction signals, means for demodulating the product to derive a corrected video signal, and means effective when said video signal and said carrier go to zero for suppressing said correction signals.

6. In a flying spot scanner system wherein sawtooth signals at line and frame frequencies are produced for deflection purposes, and wherein a video signal having a black level representing zero signal is produced and it is desired to effect shading correction of the video signal by means of correction signals, means for deriving shading-correction signals from said sawtooth signals, means for amplitude modulating a high frequency carrier with the video signal in such manner that said black level corresponds to zero carrier, and for also amplitude modulating said carrier with said shading-correction signals, means for demodulating the modulated carrier to derive a corrected video signal, and means effective when the uncorrected video signal and said carrier go to zero for suppressing said correction signals.

7. A flying spot scanner system according to claim 6, wherein the means for modulating said carrier includes a first modulator stage in which the carrier is amplitude modulated with the video signal and a second modulator stage in which the carrier is amplitude modulated with the shading-correction signals.

8. A flying spot scanner system according to claim 6, wherein the means for modulating said carrier comprises a single modulator stage in which the carrier is amplitude modulated with both the video signal and the shading-correction signals.

9. In a flying spot scanner system wherein sawtooth signals at line and frame frequencies are produced for deflection purposes, and wherein a video signal having a black level representing zero signal is produced and it is desired to effect shading correction of the video signal by means of correction signals, means for deriving shading-correction signals from said sawtooth signals, means for amplitude modulating a high frequency carrier with the video signal in such manner that said black level corresponds to zero carrier, and for also amplitude modulating said carrier with said shading-correction signals, said modulating means including at least one vacuum tube from the plate circuit of which the modulated carrier is derived, means for demodulating the modulated carrier to derive a corrected video signal, and an impedance network in the plate circuit of said tube effective when the uncorrected video signal and said carrier go to zero for suppressing said correction signals.

References Cited in the file of this patent

UNITED STATES PATENTS

| | | |
|---|---|---|
| 2,469,606 | Mayle | May 10, 1949 |
| 2,658,104 | Smith | Nov. 3, 1953 |